United States Patent

[11] 3,584,238

[72] Inventor Donald A. Purland
 Eden Prairie, Minn.
[21] Appl. No. 770,235
[22] Filed Oct. 24, 1968
[45] Patented June 8, 1971
[73] Assignee Harvey Hubbell, Incorporated
 Bridgeport, Conn.

[54] FULL CYCLE CONTROL SYSTEM
 6 Claims, 4 Drawing Figs.
[52] U.S. Cl. .................................................. 307/262,
 307/218, 307/241, 307/252, 307/273, 328/74
[51] Int. Cl. ........................................................ H03k 1/18
[50] Field of Search .......................................... 307/252,
 310, 218, 215, 241, 262, 284, 273; 328/72—74

[56] References Cited
 UNITED STATES PATENTS
 3,139,540 6/1964 Osborne ...................... 307/215
 3,426,969 2/1969 Anderson .................... 307/310 X
 3,492,512 1/1970 Eckl ............................ 307/252 X
 OTHER REFERENCES
 GE SCR Manual FIG. 8.15 Copyright 1961, Second Edition
 Tk 2798 G4g c.5 (Copy enclosed)

*Primary Examiner*—John S. Heyman
*Attorney*—Baldwin, Egan, Walling and Fetzer

ABSTRACT: An electronic control system for variably phase regulating or controlling the application of electrical energy to a connected load. The control system uses a unijunction transistor as a pulse generator which has its output connected to a pulse transformer circuit which, in turn, is connected to phase-regulated switch devices such as thyristors or silicon-controlled rectifiers (SCR). The phase-regulated switch devices are connected to the load to be controlled and operate to provide energy to said load during the "on time" thereof.

The unijunction generator is caused to fire at predetermined cyclic intervals to provide "full cycle" power control to the connected load. The control system has circuit control means which controls the operation of the unijunction generator and assures that when the generator is fired or "turned on" it will be for a period longer than one-half cycle of the frequency of the power source to thereby provide and guarantee "full cycle" power control.

The electronic control system may be utilized to regulate the application of electrical energy in alternating current, single or multiple phase loads.

The unijunction transistor generator is controllably operated by circuit means which generates a firing signal which is the additive combination of an initiating signal and a synchronizing signal. The initiating signal is the signal which indicates that the load requires additional power and the synchronizing signal is generated by the source of energy to which the load is connected.

INVENTOR
DONALD A. PURLAND

Baldwin, Egan, Walling & Fetzer
ATTORNEYS

FULL CYCLE CONTROL SYSTEM

A primary object of the present invention is to provide an electronic control system for regulating the application of electrical energy to a connected load and which system includes a wave generator, the output of which is synchronized with the source of energy to which it is connected and wherein phase regulated electronic switch means are responsive to the operation of the said wave generator to provide energy to the load.

Additional objects and advantages will be hereinafter apparent to one skilled in the art to which this invention relates, and upon reference to a preferred embodiment as is disclosed in the following specification and illustrated in the accompanying drawings wherein.

THE PRIOR ART

Figure 1A:
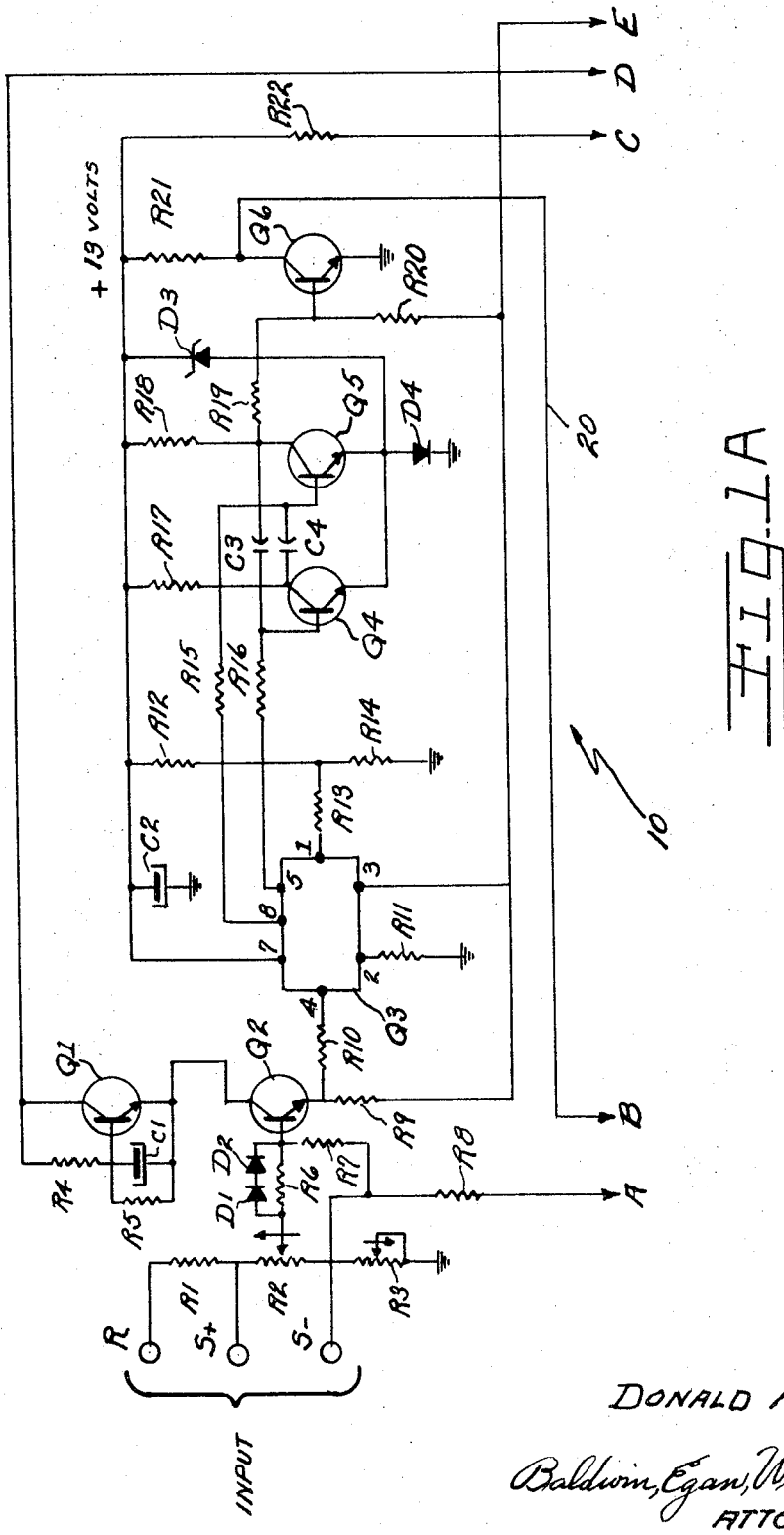
FIG. 1A is a schematic wiring diagram of the initiate signal generating circuit of the present control system.

Briefly the prior art, of which I am aware, is best exemplified by the Chin Pat. No. 3,183,372 which issued on May 11, 1965.

The control system of the Chin patent, as for example shown in FIG. 1 of the Chin patent drawings, utilizes a unijunction transistor generator 20 to control the application of energy to a load by controlling the firing of a pair of SCR's 26 and 27. The excitation of the generator 20 is controlled by a transistor 30 to the base electrode of which is applied two input signals, an "initiate" signal (terminal A) and a "sync" signal (point B) which is obtained from the power source 28.

This circuit permits a ground signal at A to bias the transistor 30 off and to start the oscillator 20. This signal applied to A can be applied at any time and will cause the SCR to fire and conduct for the remainder of this first half cycle. After the first half cycle full half cycle firing will continue to give full cycles of power output. At that instant when the signal at A is removed the oscillator is inhibited and the SCR continues in conducting state for the remainder of that half cycle. If the signal at A is removed at a time when the half cycle is odd, the residual magnetization of certain types of electromagnet devices are in the wrong polarity for starting at an even cycle again.

The control system of the present invention accomplishes the same end result as that of the Chin circuit but insures that the SCRs are always turned on at the beginning of a half cycle and that the series of half cycles always ends in even numbers. This even number of half cycles is assured by "adding" the "initiate" signal with the "sync" signal and having the sync signal occur only once per cycle. This "Added" signal fires a "one shot" circuit that operates the unijunction generator. The length of this "Added" signal is always greater than a half cycle to insure that the generator is always fired for a complete cycle. Removal of the initiate signal will not cease the operation of the SCRs until a complete cycle has been effected. The initiate signal waits for a "sync" signal which is of line frequence before the unijunction generator is unlocked. This "Added" signal starts a delay multivibrator whose period (approximately 12 microseconds) is set longer than a half cycle of line frequency (8.33 microseconds) for a 60 cycle line. This output of the multivibrator is applied to the unijunction generator to unlock the same.

Referring now to the drawings of this application, the full cycle control system of the present invention is seen to include a signal generation circuit 10, FIG. 1A which is operable to provide the "initiate" signal.

A series of terminals R, S+ and S− are provided at the input end of the circuit 10 to enable an input signal to be applied to said circuit and which signal is intended to indicate that the load connected to the control system requires additional energy. As shown, the terminal inputs are adapted to accommodate three levels of potential and two polarities.

Said terminals are connected into a resistance divider network comprising resistors R1, R2 and R3. In the instant embodiment, resistors R2 and R3 are variable, the input signal being developed across R2 and applied through its adjustable arm to the parallel combination of diodes D1, D2 and resistance R6 to the base electrode of transistor Q2 connected as an emitter follower.

The output or emitter electrode of follower Q2 is connected through its coupling resistance R10 to the input (terminal 4) of a conventional differential amplifier identified schematically at Q3. One such amplifier applicable for use in the instant control system is the Westinghouse amplifier (No. WE 115T).

The amplifier has two output terminals numbered 5 and 8 which, in turn, are connected respectively through resistances R16 to the base of transistor Q4; and through resistance R15 to the base of transistor Q5. Transistors Q4 and Q5 are seen to be connected as a free-running multivibrator.

In the manner well known in the art, when an input signal is applied to terminal 4 of the differential amplifier, the signal level at either one of the output terminals 5 and 8 goes higher than the signal level on the other of said output terminal.

In the instant embodiment of control circuitry, it is contemplated that the application of a signal to the input terminal 4 will cause the signal level at terminal 8 to increase and the signal level at terminal 5 to decrease.

The frequency of the free-running multivibrator Q4, Q5 is determined by the RC networks R15, C4 and R16, C3 as also by the source voltage connected to resistors R15 and R16.

The collector electrode of transmitter Q5 is connected to the base electrode of transistor inverter Q6. The collector electrode of inverter Q6 is connected by conductor 20 to diode D5 which comprises one input to AND gate 23, formed by diodes D5 and D6.

Figure 1B:
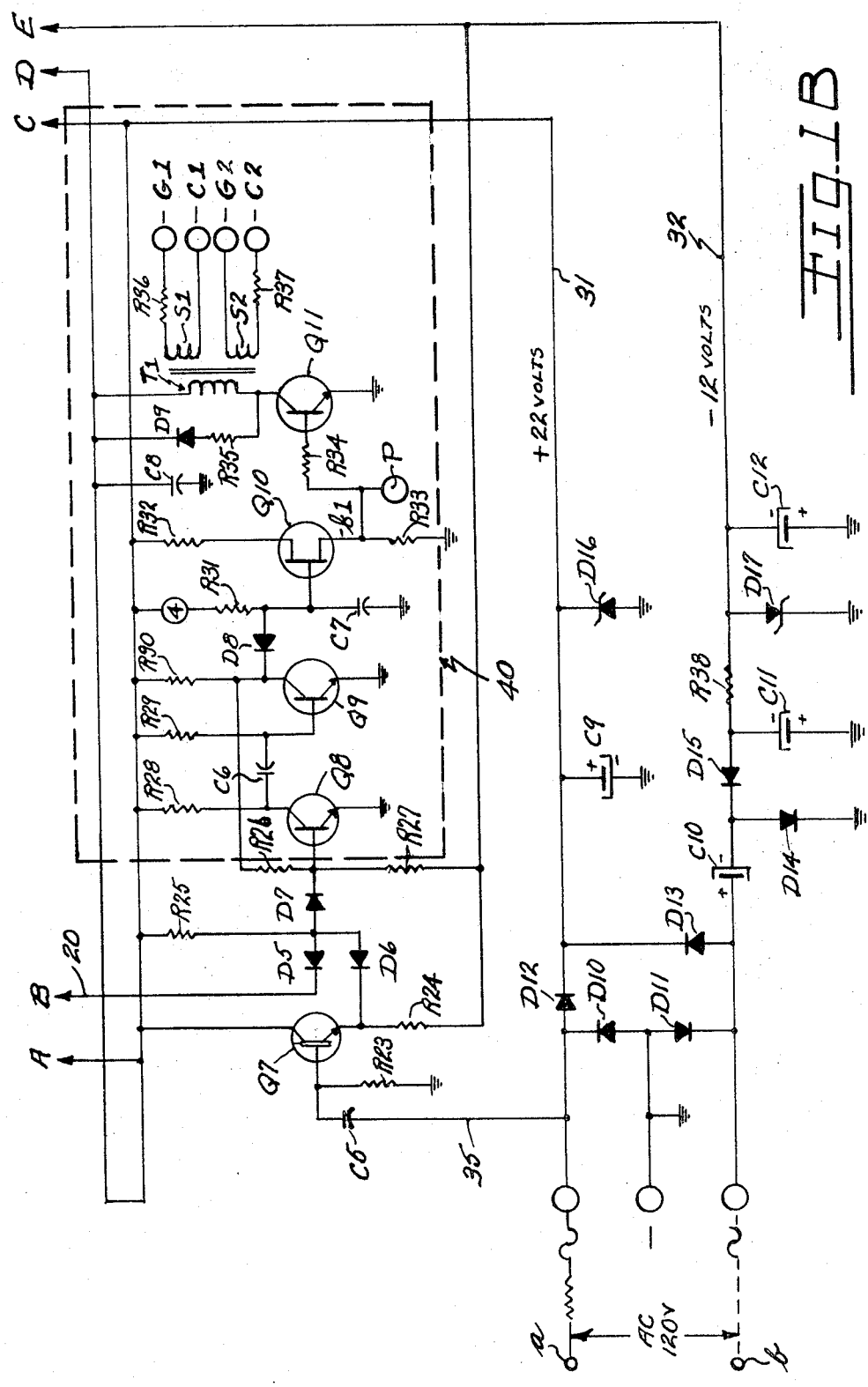
FIG. 1B is a schematic wiring diagram of the sync signal and the control pulse generating circuits.

As seen in FIG. 1B, the instant control system incorporates the use of a full wave bridge rectifier as the source of energy identified in its entirety by the reference PS and which is of conventional construction to provide a positive potential of +22 volts DC and a negative potential of −12 volts DC to the system by way of conductors 31 and 32, respectively.

As seen in FIG. 1b, conductor 35 connects to one side of the 60 cycle alternating current input of the rectifier and couples the same through capacitor C5 to the base electrode of emitter follower Q7 which comprises a second input to the AND gate D5, D6. The capacitor C5 and base resistor R23 of emitter follower Q7 functions as a differentiating network for the alternating current input thereto to provide a fast rise pulse at a 60 cycle rate which is then applied through said follower Q7 to diode D6 of said AND GATE.

The output of AND GATE D5, D6 is the input of a signal pulse generating circuit as identified in its entirety at 40 and is connected to the input of said circuit by way of disconnect diode D7. In its present circuit configuration the diode D7 is connected to the base of transistor Q8 which, with transistor Q9, is connected as a monostable multivibrator.

In its quiescent or no signal input state, transistor Q9 is normally turned off whereas transistor Q9 is turned on.

The collector electrode of transistor Q9 is connected by diode D8 to the emitter of an unijunction transistor generator Q10.

The output signal from generator Q10 is taken from its base electrode b1 and applied to the base of amplifier Q11 connected in its common emitter configuration.

The primary winding of a pulse transformer T1 is connected to the collector of amplifier Q11. Said transformer is provided with two secondaries S1 and S2, each of which is provided with terminals (G., C1); (G2, C2) respectively, whereby the pulse signal generated in said transformer secondaries may be connected to the load control circuit of the present system as shown in FIG. 2.

Figure 2:
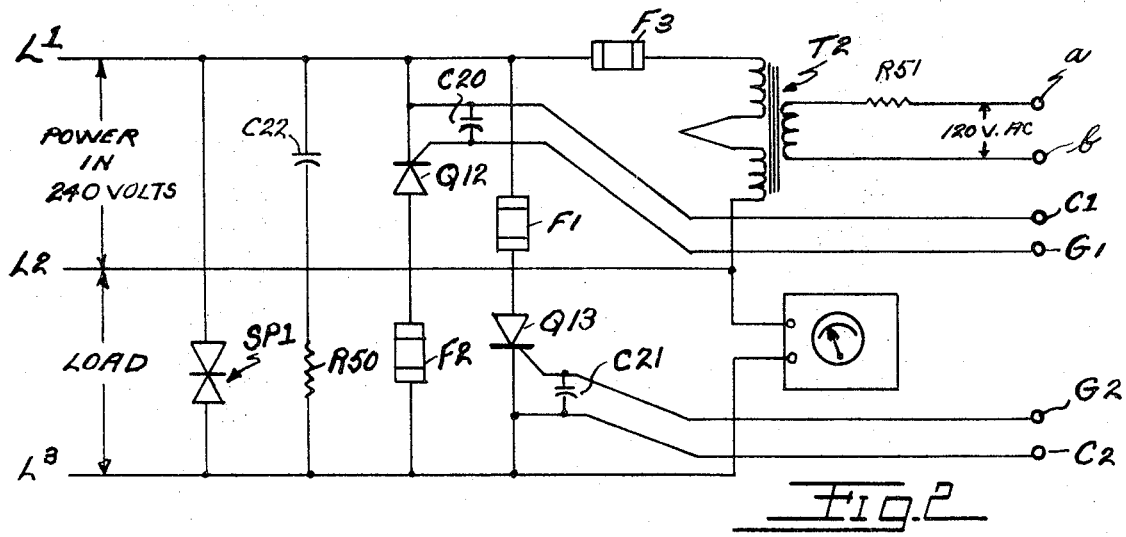
FIG. 2 is a schematic of a typical load control circuit adapted for use with the control system circuitry of FIGS. 1A and 1B.

As aforementioned, this full-cycle control system is intended to variably control the application of power to a connected load and as will be hereinafter understood the load may be single phase as shown in FIG. 2 or multiple phases.

In actual use, the load has been a bank of heater lamps for an industrial baking oven and which is operative to provide a desired temperature level to the said oven.

The heater lamps may be connected as a separate single phase load or as a multiple phase load, Wye or Delta connected.

As seen in FIG. 2 the load is intended to be connected across line terminals L2 and L3 and the power input, as for example 249 volts across line terminals L1 and L2.

A pair of thyristors Q12 and Q13 are by their respective anode-cathode paths in inverse parallel relation between line terminals L1 and L3. Fuses F1 and F2 are also seen to be connected in series in the anode circuit of said thyristors, and are preferably of the fast acting or response type effective to protect the thyristors from line current surges which exceed their respective ratings. Fuse F3 is the typical line fuse connected in the line terminal L1 and one side of the primary of power transformer T2.

Surge suppressor SP1 connected between line terminals L1 and L3 also provide said thyristors with protection from voltage transients.

Resistor R50 and capacitor C22 connected across line terminals L1 and L3 and capacitors C20 and C21 connected across the cathode-gate circuit of each thyristor Q12 and Q13 prevent voltage transients from firing the thyristors in the absence of a signal from the pulse generator circuit 40.

Transformer T2 is seen to have a secondary winding which is provided with terminals $a$ and $b$ which are intended to be connected to corresponding input terminals $a$ and $b$ of the bridge rectifier circuit PS as seen in FIG. 1B.

The output terminals G1 and C1 of the secondary winding S1 of pulse transformer T1 are connected to the corresponding terminals G1 and C1 which connect respectively to the gate and cathode electrodes of the thyristor Q12. In like manner, terminals G2 and C2 of secondary winding S2 connect to the gate and cathode electrodes of thyrister Q13.

In operation the control system described is as follows.

A conventional thermocouple (not shown) may be placed in proximity to the connected load and connected also to the input terminals (R, S+ and S−) of the control system whereby a change in the temperature level of the oven will result in a signal being generated in the thermocouple sufficient to be applied to the instant control and to thereby initiate an increase in the power to be applied to said load.

With the control system connected to the voltage potentials provided by the power supply PS, when this input signal is applied, a signal is developed across potentiometer R2 and applied to the base electrode of emitter follower Q2 which drives the differential amplifier Q3. This amplifier Q3 is normally set by the voltage divider circuit R12 and R14 so that with a zero input signal, the output voltage on amplifier terminal 8 is low, approximately +0.8 volt, and voltage on amplifier terminal 5 is approximately +10 volts. With the input signal applied to amplifier terminal 4, the amplifier switches so that the voltage on terminal 8 increases and the voltage on terminal 5 decreases.

When this occurs, the voltage increase on terminal 8 is applied to the base electrode of transistor Q5 of the free-running multivibrator Q4, Q5.

At quiescent condition, i.e. with no signal input, transistor Q4 is turned on. Diode D4 biases the emitters of Q4 and Q5 to approximately +0.6 volts so that the net voltage to the base-emitter circuit of Q5 is zero.

When the signal input increases the voltage level to the base of transistor Q5 base current begins and Q5 conducts whereby to start multivibrator action. As aforementioned, the frequency and pulse width of the multivibrator output is determined by the source voltages and RC networks R15, C4 and R16, C3. The signal output pulse from transistor Q5 is applied to the base of inverter Q6 wherein it is inverted and applied by conductor 20 to diode D5 of the AND gate D5, D6.

As previously discussed, 60 cycle synchronization voltage is taken from one side of the bridge rectifier through conductor 35. This voltage is the input to a differentiating network comprising capacitor C5 and resistor R23. This "sync" pulse is isolated by emitter follower Q7, and then applied to diode D6 of said AND gate.

When a pulse is present on both diodes D5, D6 of the AND gate, said gate will open and provide an output pulse which is then applied to diode D7. Diode D7 passes the pulse onto transistor Q8 of the delay multivibrator Q8, Q9 effective to trigger the same.

Figure 3:
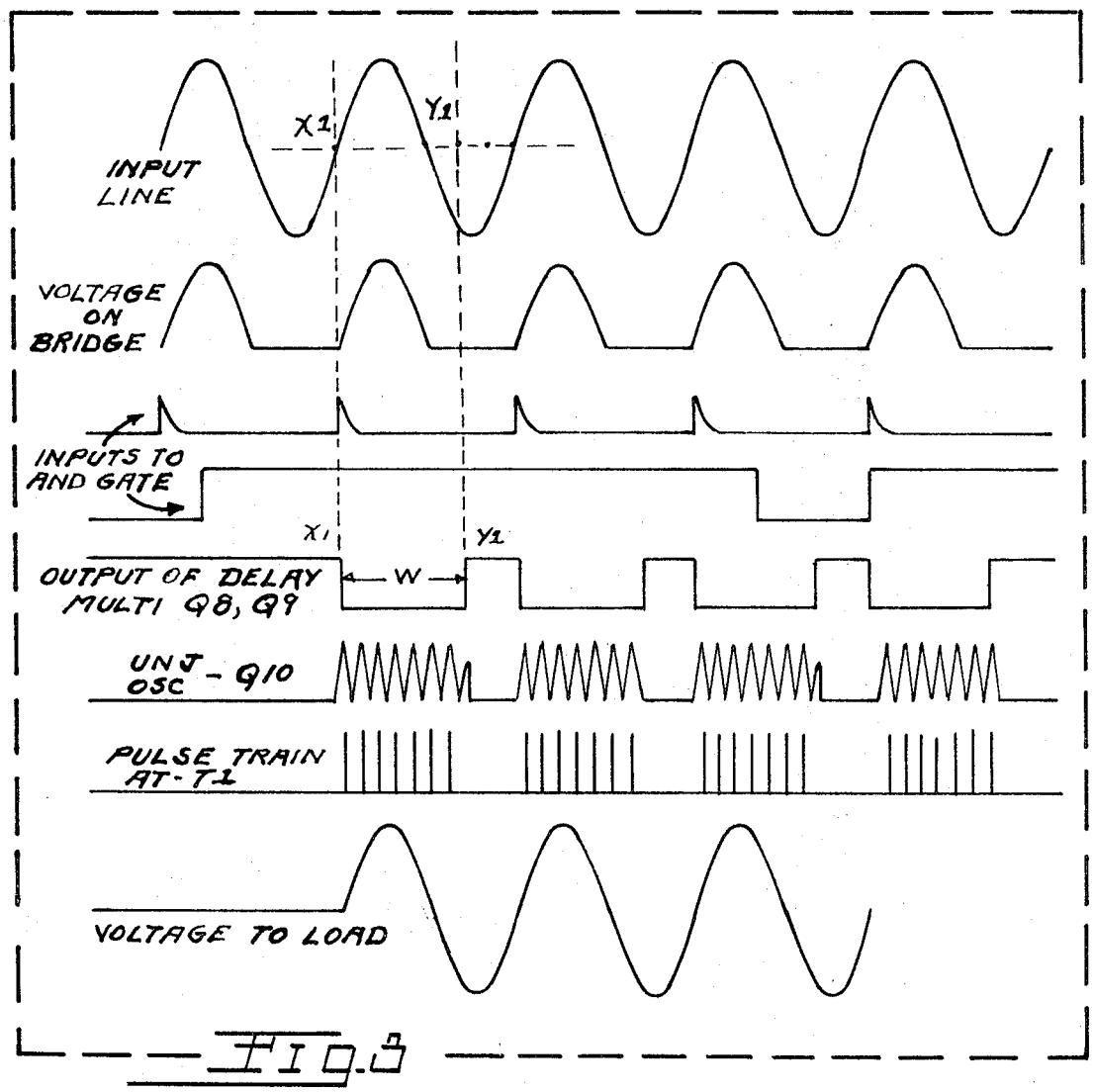
FIG. 3 is a series of voltage waveforms which occur at various points in the control system.

As seen in the waveforms of FIG. 3, line 1 shows the voltage of the power input connected to the line terminals L1, L2; line 2 is the waveform of the half-wave rectified 60 cycle "sync" voltage appearing on conductor 35 from the bridge rectifier, and the waveform appearing on line 3 in the resultant "sync" pulse provided by differentiating capacitor C5 and resistor R23.

The voltage waveform appearing in line 4 in FIG. 3 is the output signal from the inverter Q6 which in turn is the inverted output pulse from the multivibrator Q4, Q5.

As previously mentioned, when the "sync" pulse (60 cycle) line 3, FIG. 3, appears on diode D6 and the output pulse from inverter Q6, line 4, FIG. 3 appears on diode D5 said AND gate opens to trigger the multivibrator Q8, Q9.

In its quiescent condition, Q9 is conducting and diode D8 clamps the voltage level at resistor R31 to system ground. When the multivibrator is "fired" transistor Q9 is shut off and the diode D8 unclamps said voltage level on R31 whereby capacitor C7 is allowed to charge. The voltage across C7 is connected to the emitter of unijunction transistor Q10. When the charge voltage on capacitor C7 reaches the firing point of Q10, it will discharge C7 through base resistor R33. This capacitor discharge is in the form of a pulse. The pulse width of Q9 is set by the RC constant of R29/C6 of the multivibrator Q8, Q9 and for a 60 cycle load is set to be approximately 14 milliseconds long. This allows Q10 to fire into the next half cycle, allowing both thyristors Q12, Q13 to be turned on, providing a full cycle of load current. For example, as seen in FIG. 3, line 5, the width $-w-$ of the pulse output of multivibrator Q8, Q9 starts at point $x_1$ which is the beginning of the second cycle of the 60 cycle input (line 1) and terminates at point $y_1$ which is approximately 225° after start or into the next or negative half cycle of said second cycle.

Part of the discharge path of capacitor C7 is through resistor R34 and the base/emitter circuit of pulse amplifier Q11. When Q10 is fired, it will in turn drive Q11 on producing pulses for the thyristors Q12, Q13.

The waveform on line 6 of FIG. 3 is the pulse output of the unijunction generator Q10.

The waveform appearing on line 7 of FIG. 3 is the pulse output of amplifier Q11 and which is applied to the pulse transformer T1.

As a result, the thyristors Q12 and Q13 are turned as for a period greater than one half cycle per each cycle of the connected load whereby to provide "full cycle" application of power thereto.

In this manner, the instant control system is capable of providing power triggering the thyristors Q12, Q13 such that if they are turned-on at the positive half of a cycle they will be turned-off at the end of the negative half of the cycle.

As seen in FIG. 1B, terminal T6 may be provided as the one base electrode of the unijunction generator Q10 whereby its pulse output may be utilized to initiate a similar control of the second phase of a three phase load, it being understood in the art that a suitable electrical delay must be provided so that the control for the second phase is 120 electrical degrees after the second phase. Likewise, the pulse output of said generator Q10 may be used after suitable electrical delay of 120 electrical degrees after the second phase to similarly control the third phase of said three phase load.

The following list indicates the magnitude of resistor and capacitor components actually used in the making of the embodiment of control system as disclosed herein:

RESISTORS

| R1 | 10KΩ | R26 | 10K |
|---|---|---|---|
| R2 | 500Ω pot. | R27 | 18K |
| R3 | 250Ω pot. | R28 | 4.7K |
| R4 | 270K | R29 | 51K |
| R5 | 47K | R30 | 1K |
| R6 | Selected | R31 | 3.3K |
| R7 | 10K | R32 | 390Ω |
| R8 | 4.7K | R33 | 91Ω |
| R9 | 10K | R34 | 100Ω |
| R10 | 4.7K | R35 | 100Ω |
| R11 | Selected | R36 | 33Ω |
| R12 | 120K | R37 | 33Ω |
| R13 | 4.7K | R38 | 220Ω |
| R14 | Selected | R50 | 50Ω |
| R15 | 47K | R51 | 750Ω |
| R16 | 47K | | |
| R17 | 4.7K | | |
| R18 | 4.7K | | |
| R19 | 10K | | |
| R20 | 22K | | |
| R21 | 1K | | |
| R22 | 470K | | |
| R23 | 12K | | |
| R24 | 10K | | |
| R25 | 22K | | |

CAPACITORS

| C1 | 450μf. |
|---|---|
| C2 | 100μf. |
| C3 | 3.3μf. |
| C4 | 3.3μf. |
| C5 | 0.047μf. |
| C6 | 0.68μf. |
| C7 | 0.1μf. |
| C8 | 0.005μf. |
| C9 | 500μf. |
| C10 | 50μf. |
| C11 | 50μf. |
| C12 | 100μf. |
| C20 | 0.47μf. |
| C21 | 0.47μf. |
| C22 | 0.47μf. |
| C23 | |

Having thus described a preferred embodiment of the control system of the present invention it is apparent to one skilled in the art that it is susceptible to various modifications and combinations without departing from the inventive concepts as they are identified in the claims.

What I claim is:

1. A control system for variably regulating the application of electrical energy from an energy source to a connected load comprising first circuit means responsive to a signal indicating the load required energy and operable to provide a first signal, second circuit means connected to said source and operative to generate a second signal having a recurrence rate equal to the frequency of the source, an AND gate and means for connecting said first and second signals to said gate, the presence of both said signals on said gate being operable to open said gate, third circuit means connected to said gate being operable thereby to generate a third signal synchronized with the frequency of said source, said third circuit means including impedance means having a predetermined time constant with respect to the cyclic frequency of the energy source, said impedance means causing the operation of said third circuit means for a period of time whereby the time period of the third signal is greater than the one-half cycle time period of the energy source, pulse generator means and means connecting said third signal to said generator means effective to excite said generator means and produce a pulse train, and circuit means connected to said generator means and said source of power responsive to said pulse train to connect said source of energy to said load.

2. A control system as defined in claim 1 and wherein the first circuit means includes multivibrator means which provides a signal having a generally square waveform.

3. A control system as defined in claim 1 and wherein the second circuit means includes signal differentiating means.

4. A control system as defined in claim 1 and wherein the AND gate comprises a pair of diode elements.

5. A control system as defined in claim 1 and wherein the circuit means connected to the generator means includes means responsive for the duration of the pulse train to connect the source of power to said load.

6. A control system as defined in claim 1 and wherein the circuit means connected to said generator means includes means for connecting said pulse train to a second control system whereby to provide for variably regulating a second phase of a multiple phase source of energy.